United States Patent Office 3,557,031
Patented Jan. 19, 1971

3,557,031
STAIN-RESISTANT MOLDING COMPOSITION
Norman W. Standish, Shaker Heights, and Richard W. Yanik, Warrensville Heights, Ohio, assignors to The Standard Oil Company, Cleveland, Ohio, a corporation of Ohio
No Drawing. Filed Aug. 13, 1968, Ser. No. 752,133
Int. Cl. C08g 9/24, 37/3, 37/34, 51/18; C08k 1/44
U.S. Cl. 260—17.3           12 Claims

ABSTRACT OF THE DISCLOSURE

Stain-resistant molded articles can be prepared from standard, non-stain resistant melamine-formaldehyde molding powder by dry-blending minor amounts of certain amides into the molding powder prior to the molding operation.

---

The present invention relates to a process for preparing a molding composition and to the preparation of stain-resistant molded articles therefrom. More particularly, the present invention relates to a process for preparing a melamine-formaldehyde molding composition which contains minor amounts of an amide and which has been demonstrated to have substantially improved coffee-stain resistance.

Staining and loss of luster of melamine dinnerware has been a limiting factor in gaining wide acceptance of this product in dinnerware markets and has discouraged some potential consumers in existing markets. In producing stain-resistant melamine dinnerware the traditional approach has been to modify the composition of the polymer chain during the resin production as in, for example, U.S. Pat. 2,579,985. In this process melamine and the stain-resistant component, benzoguanamine, are co-reacted with formaldehyde to produce a resin with increased stain resistance over that of a melamine-formaldehyde molding resin.

We have discovered a method for producing a stain-resistant molding resin in which no attempt is made to modify the resin composition, but involves the formation of a physical dispersion of a reactive, hydrophobic additive in a standard melamine molding powder. The additive is dry-blended into the molding powder prior to the molding operation. Under heat and pressure of the molding cycle, the additive is believed to be incorporated into the chemical structure by means of a surface polymerization reaction, thereby modifying the plastic surface and producing stain resistance. This being a surface reaction, only very minor amounts of the additive are required to produce the desired effect as compared with the much larger required amounts of polymer chain modifiers of the prior art.

It is believed that the additive is incorporated at terminal functional groups rather than included in a random fashion throughout the melamine-formaldehyde polymer chain, and thus the usual problems associated with color drift, long cure times and heat stability are minimized. Additionally, molding powders produced by the present method have much improved flow properties.

The amide additives suitable for imparting stain resistance to the molding resin compositions of this invention are normally solids at ambient temperatures, capable of being uniformly dispersed in the substrate resin composition by milling, and have little or no tendency to generate volatile gases during molding cycle operations which might alter the surface of the plastic. Those amide additives effective for this purpose include fatty acid amides, N-alkanol fatty acid amides, N-alkyl amino fatty acid amides, and polyamides. Also effective are polynitriles which are capable of being hydrolyzed to the corresponding amides in the course of the molding operation. Particularly suitable are the saturated and unsaturated fatty amides represented by the following formula:

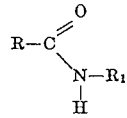

where R may be an alkyl or an alkenyl radical containing at least 15 carbon atoms and $R_1$ may be hydrogen, a hydroxy alkyl group containing up to 3 carbon atoms or an amino alkyl group containing up to 3 carbon atoms. Examples of these compounds include oleamide, stearamide, erucamide, palmitamide, behenamide, N-methylol stearamide, N-ethylol behenamide, N-methylamino stearamide, N-ethylamino oleamide and the like. Polyamides useful as additives in this molding resin composition are the various nylons, such as nylon 66, nylon 6, nylon 4, etc. Polynitriles prepared from alpha, beta-monoolefinically unsaturated nitriles, such as acrylonitrile and methacrylonitrile, are also suitable for this purpose.

These active additive compounds are dry-blended into the molding resin in concentrations of from about 0.1 to 10% by weight and preferably in concentrations of from about 0.3 to 6% by weight, based on the total composition of the molding powder. Higher concentrations cause undesirable surface effects which result in a decrease in the stain resistance of the resin.

The use of fatty acid amides in a melamine-formaldehyde liquid resin as a protective coating on a curing catalyst to prevent hydrolysis of the catalyst and subsequent resin cure during the pot-life period is the subject of German Pat. 1,057,327 which issued May 27, 1964. However, a higher concentration of the amide than that disclosed in the German patent is required in the instant invention to obtain stain resistance.

In preparing the melamine-formaldehyde resins of this invention, a commercial aqueous solution of formaldehyde containing 37% formaldehyde by weight is reacted with melamine in a molar ratio of about 1:1 to 3:1. The mixture is stirred and the pH of the mixture is adjusted to between 8 and 10 with a base such as sodium hydroxide or ammonium hydroxide. The mixture is heated to reflux until a syrup is formed.

The molding resin is prepared from this syrup by adding a conventional filler such as clay, asbestos, paper, fiber, etc., and preferably alpha cellulose in amounts ranging from 20–70 parts per 100 parts of resin. After thorough blending, the impregnated filler is dried and conventional pigments, curing catalysts, mold-release agents and brighteners are added.

The drying step is accomplished in a continuous type oven where the impregnated filler travels through an oven on a belt and is contacted with hot air at about 180–210° F. to remove moisture. The resin is obtained from the oven in a coarse granular form referred to as "popcorn." The "popcorn" granules are reduced in size by passing through a pre-grinder. To this finer granular material are added the aforementioned additives, the pigments, curing catalyst, mold-release agent, brightener and the like. At this point the desired amount of the stain-resistant additive is likewise added. These materials are uniformly dispersed and blended into the resin substrate by ball milling, high-speed mixing, as a Prodex Henschel mixer, etc. Ball milling, which is used most frequently, is carried out in a rotatable drumlike apparatus which contains flint or porcelain balls of the same or varying diameters. The ball milling may be carried out at temperatures of from 32–120° F. for a period of from ½ to 24 hours. More efficient grinding is obtained at the lower temperature range, from about 40–70° F., and with a minimum mixing time. The optimum grinding time varies with the composition of the material being homogenized. Pressure is non-critical in the ball-milling operation. Although atmosphere pressure is normally used, pressure up to about 25 p.s.i. may be employed, if so desired.

The ground product is then molded into various shapes by subjecting the resin to temperatures of from 250–375° F. and pressures of from 1400–4000 p.s.i. for a period of 1–10 minutes.

In order that the present invention may be more completely understood, the following examples illustrate in greater detail the various steps of the process. These examples, however, are set forth primarily for the purpose of illustration and are not to be interpreted as limitations of the invention.

EXAMPLE 1

(A) Preparation of molding powder 126 parts (1.0 mole) of melamine and 178 parts (2.2 moles) of 37% aqueous formaldehyde solution were introduced into a reaction vessel equipped with a reflux condenser, thermometer and stirrer. The mixture was stirred for about 5 minutes to break up any aggregated material, and the pH was adjusted to 8.5–9 (glass electrode at 25° C.) using a one-normal solution of sodium hydroxide. The reaction mixture was heated to reflux in 15 minutes and reflux was continued until one drop of the resin hydrophobed in 25 cc. of water (25° C.) and the Ford cup viscosity was about 25 seconds. The resin was then cooled to 70° C.

The resin syrup (63% solids) and 94 parts of alpha cellulose pulp flock were mixed thoroughly in a sigma blade mixer for 45 minutes. The cellulose-resin mixture was dried in an air stream for 1 hour at 190° F. and 18% relative humidity. The resulting dry resin (100 parts) was ground with 0.20 part phthalic anhydride, 0.5 part zinc stearate and 0.5 part of rutile titanium dioxide for 8 hours.

(B) Preparation of stain-resistant powder 100 parts of the dry molding powder prepared as described in (A), above, were mixed with 0.5 part of the stain-resistant component, stearic acid amide, and placed in a ball mill. The mixture was milled for a period of 5 hours. Molded articles with excellent surface gloss were obtained by molding at 3000 p.s.i. and 175° C. for a period of 3 minutes.

The procedure used in preparing the stain-resistant molding powders in the following examples was the same as that in Example 1(A) and (B) except that the stearic acid amide was replaced by the various stain-resistance additives in the amounts indicated.

EXAMPLE 2

The procedure of Example 1 was repeated where the stain-resistance additive consisted of 0.5% erucamide.

EXAMPLE 3

The procedure of Example 1 was repeated where the stain-resistance additive consisted of 0.5% behenamide.

EXAMPLE 4

100 parts of the dry molding powder described in Example 1(A) were mixed with 1.0 part of behenamide and placed in a Prodex Henschel mixer. The vessel was sealed and the mixing blades were revolved at 3800 r.p.m. for a period of 15 minutes with constant cooling of the vessel jacket. This product was molded at 3000 p.s.i. and 175° C. for 3 minutes.

EXAMPLE 5

The procedure of Example 1 was repeated where the stain-resistance additive consisted of 0.5% oleamide.

EXAMPLE 6

The procedure of Example 1 was repeated where the stain-resistance additive consisted of 0.5% N-ethanol stearamide.

EXAMPLE 7

The procedure of Example 1 was repeated where the stain-resistance additive consisted of 5% acetamide.

EXAMPLE 8

The procedure of Example 1 was repeated where the stain-resistance additive consisted of 5% benzamide.

EXAMPLE 9

The procedure of Example 1 was repeated where the stain-resistance additive consisted of 5% acrylamide.

EXAMPLE 10

100 parts of the dry molding powder prepared as described in Example 1(A) were mixed with 4.0 parts of hexamethylene diamine-adipic acid polyamide (nylon 66) which had been pre-ground to a particle size of 20–30 microns. This mixture was placed in a ball mill and milled for a period of 5 hours. The product was molded at 3000 p.s.i. and 175° C. for 3 minutes.

EXAMPLE 11

100 parts of the dry molding powder as described in Example 1(A) were mixed with 10 parts of polymethylacrylonitrile (molecular weight 150,000) which was prepared by free radical emulsion polymerization of methacrylonitrile. This mixture was placed in a ball mill and milled for 8 hours to obtain a uniform powder of less than 100 micron particle size. The product was molded at 3000 p.s.i. and 175° C. for 3 minutes.

EXAMPLE 12

The procedure of Example 11 was repeated except that polyacrylonitrile was used in place of polymethacrylonitrile.

EXAMPLE 13

A melamine molding powder was prepared utilizing a stearamide-coated $NH_4Cl$ catalyst prepared according to the procedure of Example 1 in German Pat. 1,057,327.

(A) The amide-coated $NH_4Cl$ catalyst was prepared as follows: 50 grams of stearamide (Kenamide-S) and 240 grams of trichloroethylene were heated to 75° C. To this were added 100 grams of $NH_4Cl$. The mixture was slowly cooled to 20° C. with rapid stirring. The resulting coated catalyst was filtered and vacuum dried overnight at 30–35° C. A 90% yield of $NH_4Cl$ catalyst was obtained.

(B) A melamine-formaldehyde molding powder was prepared utilizing the catalyst prepared in (A), above, by mixing the following components in a 1-liter ball mill for 5 hours:

| | Grams |
|---|---|
| Pre-ground melamine-formaldehyde popcorn | 1000 |
| $TiO_2$ (0.55% by weight) | 5.5 |
| Stearamide-coated $NH_4Cl$ catalyst (0.13% by weight) | 1.88 |

The product was molded at 2500 p.s.i. and 325° F. for 3 minutes.

The stain-resistance properties and other physical properties of Examples 1 through 13 are given in Tables I and II and these properties were measured by the test methods described below.

The coffee-stain test consisted of adding 454 parts of powdered coffee to one gallon of water and the mixture was brought to a boil. The test pieces were suspended in the solution so that they were totally immersed. Fresh coffee solution was used for each test series. In every case, a molded sample prepared from standard molding powder was included with each test. The test pieces remained in the boiling coffee solution for a period of 8 hours and for 16 additional hours as the solution cooled to room temperature. They were then washed with a mild detergent and dried.

The samples were rated visually according to a scale ranging from 1 to 10. On this scale a sample exhibiting no staining was given a rating of 1 and the degree of staining obtained on standard non-stain resistant melamine molding powder was 10. Any composition which was poorer than standard melamine molding powder was rated as 10+ and no attempt was made to determine the relative degree of staining.

Impact resistance (Notched Izod) was determined by the standard ASTM test procedure D256–56 (method A). In this test a plastic sample is held as a cantilever beam and is broken by a blow delivered at a fixed distance from the edge of the sample clamp. A notched specimen is used in all cases. The energy expended in breaking the sample is expressed in foot pounds per inch of notch.

Flow properties were measured according to the standard ASTM test procedure D569–59 (method B). In this test the degree of flow of the sample was measured in inches when subjected to a prescribed pressure for a prescribed length of time in an extrusion mold. Measurements were made in a Rossi-Peakes flow tester as described in U.S. Pat. 2,066,016.

Tensile properties were measured by means of the standard ASTM test procedure D638–61T in which the tensile properties of a standard test sample are determined under defined conditions of pre-treatment, temperature, humidity, and testing machine speed. The tensile strength is reported as the maximum load in pounds per square inch of sample required to break the sample.

Flexural properties were determined by ASTM test procedure D790–61, (A). In this test a bar of rectangular cross-section is tested in flexure as a simple beam and the load is applied midway between the supports. The sample is deflected until rupture occurs or until the maximum fiber strain of 5% is reached, whichever occurs first.

The Princeton scratch test was conducted on a Taber Shear/Scratch Tester. The sample was placed on a platform and a diamond tip at the end of a cantilever beam placed on the sample. The sample was rotated and weights on a calibrated cantilever beam were increased until a scratch appeared on the sample. Measurements were recorded as the weight in grams required to produce a scratch on the surface.

TABLE I

Coffee-stain resistance of melamine molding powder compositions

| Example: | Coffee-stain resistance rating |
|---|---|
| 1 | 8. |
| 2 | 5. |
| 3 | 5. |
| 4 | 6. |
| 5 | 8. |
| 6 | 3. |
| 7 | 10+. |
| 8 | 10+. |
| 9 | 10+ |
| 10 | 7. |
| 11 | 9. |
| 12 | 9. |
| 13 | Mottled surface. |
| Standard melamine molding powder | 10. |

The data in Table I illustrate the improvement obtained in the coffee-stain resistance of standard melamine molding powder by incorporating low concentrations of fatty acid amides (Examples 1 through 5), N-alkanol fatty acid amides (Example 6), polyamides (Example 10) and polynitriles (Examples 11 and 12), at the ball-milling stage of resin production. It is also demonstrated that the addition of low molecular weight amides (Examples 7, 8 and 9) such as acetamide, acrylamide and benzamide to standard melamine molding powder increases the susceptibility of the molding resin to coffee staining.

The data also illustrate that these additives can be incorporated into the molding powder by other means than by ball milling, as for example, by rapid mixing in a Prodex Henschel mixer (Example 4).

In Example 13 a melamine molding powder was prepared according to the teachings of German Pat. 1,057,327. The molded article obtained was highly mottled due to uneven staining, and the surface hardness and luster were poor as a result of uneven distribution of the ammonium chloride catalyst in the molding powder. The product therefor was unsuitable for dinnerware.

The data in Table II demonstrate that physical properties of the standard melamine molding powder are not altered to any appreciable extent with the addition of theses additives and that flow properties of the molding powders are substantially improved.

We claim:
1. A process for manufacturing a stain-resistant molding powder comprising:
 (A) combining a fibrous filler with a resinous syrup of a condensate of formaldehyde and melamine,
 (B) drying the combined material from (A),
 (C) adding and homogenizing an amide with the dried material from (B) said amide being selected from the group consisting of
  (a) a compound having the formula

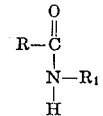

wherein R is an alkyl or an alkenyl radical containing at least 15 carbon atoms and $R_1$ is selected from the group consisting of hydrogen, a hydroxyalkyl group containing from 1 to 3 carbon atoms, or an amino-alkyl group containing from 1 to 3 carbon atoms,
  (b) polyamides and
  (c) polynitriles that are hydrolyzed in situ at elevated temperatures and pressures to the corresponding amides,
 said amide being added to (B) in amounts ranging from 0.1 to 10 percent by weight, based on the total weight of the dried material.

2. The process of claim 1 wherein the amide in step (C) is a polyamide reaction product of hexamethylene diamine and adipic acid.

3. The process of claim 1 wherein the amide in step (C) is generated in situ by the hydrolysis of polyacrylonitrile.

TABLE II.—PHYSICAL PROPERTIES OF MELAMINE MOLDING POWDER COMPOSITIONS

| | Flexural strength (×10³) p.s.i. | Tensile strength (×10³) p.s.i. | Notched Izod (ft. lbs./in.) | Princeton scratch test (grams) | Rossi-Peakes flow (inches) |
|---|---|---|---|---|---|
| Example: | | | | | |
| 1 | 12.9 | 8.5 | 0.24 | 275 | 0.44 |
| 2 | 15.3 | 8.0 | 0.25 | 225 | 0.43 |
| 3 | 12.2 | 3.8 | 0.30 | 175 | 0.54 |
| 4 | 13.6 | | 0.25 | 200 | 0.65 |
| 5 | 16.3 | 11.3 | 0.20 | 250 | 0.32 |
| Standard melamine molding powder | 14.0 | 8.0 | 0.28 | 200 | 0.40 |

4. The process of claim 1 wherein step (C) is carried out in a ball mill.

5. The stain-resistant molding powder prepared by the process of claim 1.

6. A process for preparing a stain-resistant molded article comprising:
 (A) combining a fibrous filler with a resinous syrup of a condensate of formaldehyde and melamine,
 (B) drying the combined material from (A),
 (C) adding and homogenizing an amide with the dried material from (B) said amide being selected from the group consisting of
  (a) a compound having the formula

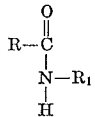

wherein R is an alkyl or an alkenyl radical containing at least 15 carbon atoms and $R_1$ is selected from the group consisting of hydrogen, a hydroxyalkyl group containing from 1 to 3 carbon atoms or an amino-alkyl group containing from 1 to 3 carbon atoms,
  (b) polyamides and
  (c) polynitriles that are hydrolyzed in situ at elevated temperatures and pressures to the corresponding amides,
 said amide being added to (B) in amounts ranging from 0.1 to 10 percent by weight, based on the total weight of the dried material, and
 (D) molding the material from (C) at an elevated temperature and pressure.

7. The stain-resistant molded article obtained by the process of claim 6.

8. The process of claim 6 wherein the molding operation in step (D) is conducted at a temperature between 250 and 375° F.

9. The process of claim 8 wherein the molding operation in step (D) is conducted at a pressure between 1400 and 4000 p.s.i.

10. The process of claim 1 wherein the amide in step (C) is erucamide.

11. The process in claim 1 wherein the amide in step (C) is behenamide.

12. The process in claim 1 wherein the amide in step (C) is N-ethanol stearamide.

References Cited
UNITED STATES PATENTS

| | | | |
|---|---|---|---|
| 2,328,425 | 8/1943 | D'Alelio | 260—17.3 |
| 2,436,363 | 2/1948 | Marvel | 260—17.3 |
| 3,081,278 | 3/1966 | Wohnsiedler | 260—17.3 |
| 3,367,917 | 2/1968 | Granito | 260—17.3 |
| 3,371,067 | 2/1968 | Anderson | 260—856 |
| 3,407,154 | 10/1968 | Casebolt et al. | 260—17.3 |

WILLIAM SHORT, Primary Examiner

E. WOODBERRY, Assistant Examiner

U.S. Cl. X.R.

260—32.6, 67.6, 849, 856